US006438447B1

United States Patent
Belka et al.

(10) Patent No.: US 6,438,447 B1
(45) Date of Patent: *Aug. 20, 2002

(54) ARTICLE INVENTORY TRACKING APPARATUS AND METHOD

(75) Inventors: Anthony M. Belka, Stillwater; Thomas J. Brace, Minneapolis, both of MN (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,580

(22) Filed: Jul. 1, 1998

Related U.S. Application Data

(63) Continuation of application No. 08/543,364, filed on Oct. 16, 1995, now Pat. No. 5,777,884.

(51) Int. Cl.[7] .................................................. G06F 7/00
(52) U.S. Cl. ........................ 700/214; 700/227; 700/235
(58) Field of Search ................................. 700/214, 236, 700/235, 227

(56) References Cited

U.S. PATENT DOCUMENTS

| 3,737,631 A | | 6/1973 | Harris | |
| 3,765,007 A | | 10/1973 | Elder | |
| 4,141,078 A | | 2/1979 | Bridges, Jr. et al. | |
| 4,285,429 A | | 8/1981 | MacTavish | |
| 4,499,444 A | * | 2/1985 | Heltemes et al. | 335/294 |
| 4,665,387 A | | 5/1987 | Cooper et al. | |
| 4,811,000 A | * | 3/1989 | Humphrey et al. | 340/551 |
| 4,839,505 A | * | 6/1989 | Bradt et al. | 235/381 |
| 4,839,875 A | | 6/1989 | Kuriyama et al. | |
| 4,881,061 A | | 11/1989 | Chambers | |
| 4,910,625 A | * | 3/1990 | Albrecht et al. | 360/135 |
| 4,967,184 A | * | 10/1990 | Regelsberger | 340/572 |
| 5,005,125 A | | 4/1991 | Farrar et al. | |
| 5,013,897 A | | 5/1991 | Harman et al. | |

(List continued on next page.)

OTHER PUBLICATIONS

"Automated Library Management System", *IBM Technical Disclosure Bulletin*, 34, Mar. 1992, Armonk, NY, pp 311–312.
"The Fast Track: To Save Staff Time . . . Patron Time . . . ", a brochure from *NEWCIRC.technology*, distributed by *Vernon Library Supplies, Inc.*, Norcross, GA, 2 pages (Updated).

*Primary Examiner*—Christopher P. Ellis
*Assistant Examiner*—Michael E. Butler
(74) *Attorney, Agent, or Firm*—Peter L. Olson

(57) ABSTRACT

An article inventory tracking and control system tracks and controls removal of articles from a secured facility. Exemplary facilities in which the system may be useful include libraries, rental stores and retail stores. Each article is marked with an EAS marker to prevent unauthorized removal. In the system, each user of a facility and each article in the facility is uniquely identifiable. Upon receiving the user and article information, the system queries a central database to ensure that the user is a valid user and that the desired transaction is authorized. A receiving compartment is specifically designed to receive a particular type of article, such as a video or audio cassette. Sensors in the receiving compartment ensure that the article is properly placed within the receiving compartment. Proper placement of the article within the receiving compartment ensures that the marker is properly re/desensitized, and also ensures that only one transaction on one article can be performed at a time.

16 Claims, 3 Drawing Sheets

U.S. PATENT DOCUMENTS

| | | | |
|---|---|---|---|
| 5,038,023 A | * 8/1991 | Saliga | 235/385 |
| 5,099,226 A | 3/1992 | Andrews | |
| 5,133,441 A | 7/1992 | Brown | |
| 5,196,684 A | 3/1993 | Lum et al. | |
| 5,260,690 A | * 11/1993 | Mann et al. | 340/572 |
| 5,288,980 A | 2/1994 | Patel et al. | |
| 5,469,142 A | 11/1995 | Bergman et al. | |
| 5,477,202 A | 12/1995 | Zarembo et al. | |
| 5,500,640 A | 3/1996 | Zhou et al. | |
| 5,534,836 A | 7/1996 | Schenkel et al. | |
| 5,625,339 A | 4/1997 | Zarembo et al. | |
| 5,777,884 A | * 7/1998 | Belka et al. | 364/478.13 |

* cited by examiner

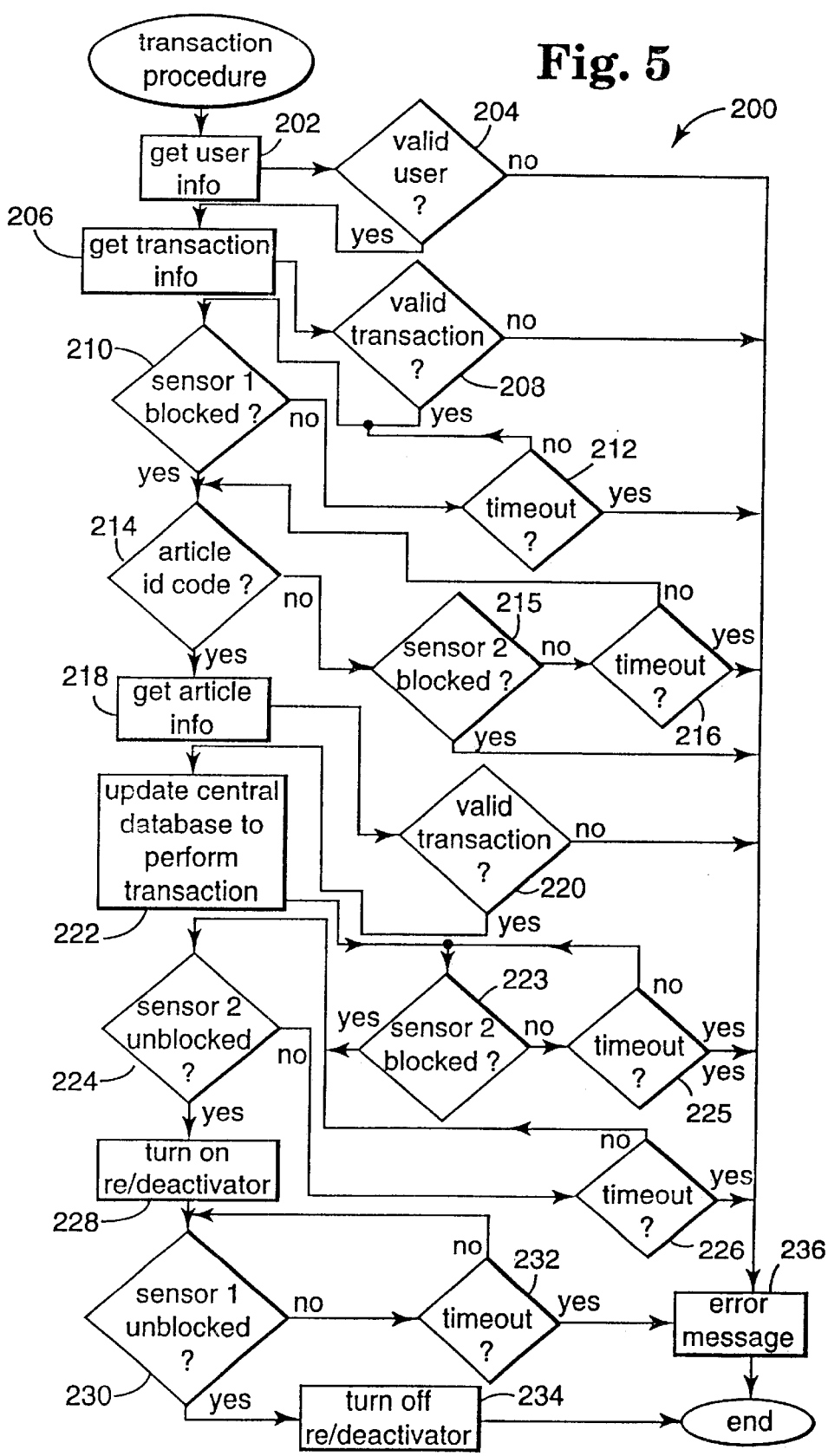

ARTICLE INVENTORY TRACKING APPARATUS AND METHOD

This is a continuation of application Ser. No. 08/543,364 filed Oct. 16, 1995. Now U.S. Pat. No. 5,777,884.

BACKGROUND

Article inventory control systems are used to authorize, track and control movement of items into and out of a facility. An example is a library circulation control system. In this case, each user is uniquely identified by an identification card containing magnetically or optically detectable data (e.g., a barcode). The items to be tracked, books in the collection of the library, for example, have a similar identifying label such that each item is uniquely identified. A computerized database contains identification data on all registered patrons of the library and identification data on all books, videos, audiocassettes, and other items in the library's collection. When someone desires to remove an item from the library, the library circulation control system first verifies that the person is an authorized patron of the library. The system determines whether the person is authorized to check out any item, or a particular class of items. The system then determines whether the particular item can be removed from the library. Some items which the library may not want removed can include certain reference items, very rare or valuable items, or items that are on reserve. If both the user and the item are authorized by the system, the item may be removed from the library by that user. The system then updates the computerized database to indicate that the particular user has checked out the particular item at issue. The system will also give a visual or audible indication to the user that the item has been checked out, or will give an error message if either the user or the item was not authorized.

To prevent unauthorized removal of items from the facility, electronic article surveillance systems (EAS) may be employed. An EAS system usually includes an EAS marker attached to the items to be protected, a mechanism for interrogating and sensing the marker within an interrogation zone, usually located near the exit of the facility, and a mechanism for preventing unauthorized removal of the article from the facility, such as a locking exit gate or an audible alarm. When an active marker is detected within the interrogation zone, the gate is locked or the alarm is sounded, thus reducing the number of unauthorized removals from the facility.

To allow authorized removal of articles from a facility, dual status markers have been developed. The dual status markers can be deactivated to allow authorized removal, such as check out from a library or video rental store, when the item is returned, the marker c an be reactivated. However, the relatively large magnetic fields required to deactivate the markers is more than sufficient to degrade the prerecorded magnetic signals on audio or video cassettes to a degree that is audibly or visually perceptible by human beings. Such effects, including print through and partial erasure, are highly undesirable.

SUMMARY

An apparatus for use in tracking and control of articles out of or into a protected area according to the present invention includes a receiving compartment adapted to receive an article of a plurality of articles. Each of the plurality of articles contains prerecorded magnetic data and further, each article of the plurality of articles has a same predefined configuration with a marker located at a same predetermined position at or near a surface of each article. The receiving compartment is sized and adapted to accept the article in a predetermined orientation within the receiving compartment. The apparatus further includes a magnetic field generating device operable to deactivate the marker and to reactivate the marker by creating a magnetic field proximate the marker without degrading the prerecorded magnetic data of the article.

A method for use in tracking articles out of or into a protected areas according to the present invention includes using a receiving compartment like that of the apparatus summarized above. The method further includes inserting an article having a marker in an activated state into the receiving compartment. It is thereafter sensed whether the article is properly placed within the receiving compartment. The marker of the article in the receiving compartment is then deactivated by creating a magnetic field of sufficient magnitude proximate only the marker. The magnetic field is of a lesser magnitude at a distance from the marker such that the prerecorded magnetic data of the article is not detectably degraded. A method for reactivating a marker in a deactivated state is also provided.

BRIEF DESCRIPTION OF THE DRAWINGS

The various objects, features, and advantages of the present invention will be understood upon reading and understanding the following detailed description and accompanying drawings, in which:

FIG. 5 is a flow chart of the control flow for the present device.

DETAILED DESCRIPTION

In the following detailed description, reference is made to the accompanying drawings which form a part hereof, and in which is shown by way of illustration a specific embodiment in which the invention may be practiced. It is to be understood that other embodiments may be utilized and structural changes made without departing from the spirit and scope of the present invention.

The present application is directed towards an article inventory tracking and control system which tracks and controls movement of articles out of and into a secured facility. Examples of facilities in which the present system may be useful include libraries, video rental stores, and other facilities in which articles are repeatedly checked out and returned. Other examples of facilities in which the present system may be useful include retail stores where the store desires to track and control article flow out of the facility.

Several set ups of the system are possible. In one embodiment, the system is set up for use by a clerk in a retail store, library, or other facility. In another embodiment, the system is set up for automated self check out or purchase by the patrons of a library, rental store, or retail store. In those facilities where articles are repeatedly checked out and checked in, the system could be set up in a variety of ways including clerk check out and clerk check in, patron self check out with clerk check in, or patron self check out and patron self check in. Any variations of the above uses and set ups are well within the scope of the present invention.

Figure 1:
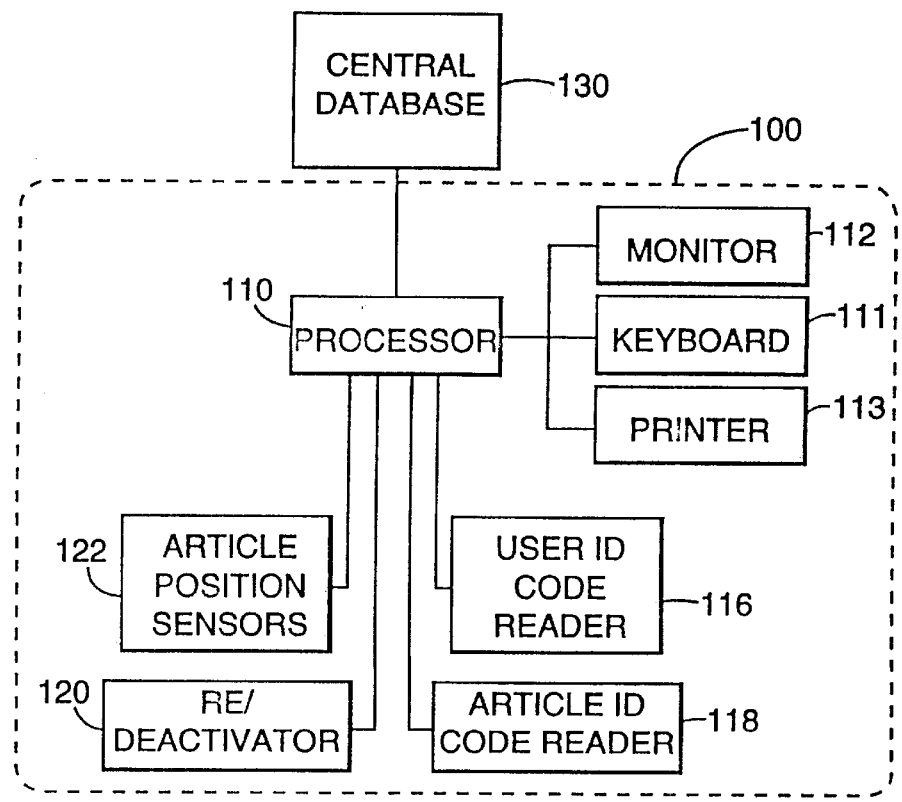
FIG. 1 is a block diagram of the present device.

FIG. 1 shows a block diagram of the present device 100. The device 100 includes a processor 110, video monitor 112, card reader 116, barcode scanner 118, sensors 122a and 122b and re/deactivator 120. The processor 110 of the device 100 is connected to a central database 130. The central database 130 would include for example, user identification and information data, and article identification and information data. In the library example, all patrons of the library and would be in the central database, and all items in the library collection would also be in the central database.

Various transactions which can be performed using the system include check out, check in and reserve (in the case of a library or rental store) or purchase (in the case of a retail store ). Preferably, the system prompts the user through the transaction process via the monitor 112. Also in one preferred embodiment, a receipt or transaction record is printed by printer 113 to provide a record of the transaction to the user.

To provide authentication and authorization of the desired transaction, each user of the facility is identifiable with, for example, a user identification card having a magnetic strip or barcode thereon. The user identification card preferably contains at least one piece of identifying information such as a user number. The user id code scanner 116 reads the user id number from the user identification card, and sends the information to the processor 110. The processor then communicates with the central database 130 to obtain the user information, such as name, address, telephone number, etc., and also other relevant information such as the types of articles that user is authorized to check out, whether any fines are owed, etc.

Similarly, each item in the library's collection is identifiable through an article identification code. The article identification code can be, for example, a barcode that is permanently affixed to the article, embedded or inscribed in the article, or affixed to a tag adapted to be attached to the article. The article id code scanner 118 reads the article identification code and sends the information to processor 110. The processor then communicates with the central database 130 to obtain the article information, such as its title, status, whether it can be checked out, etc.

The processor uses the information received from the central database to authenticate both the user and the article, and also to determine whether the desired transaction is authorized. If any of the evaluations by processor 110 are indicative of an unauthorized user or unauthorized article, an error message is sent to the video monitor and the transaction is not allowed to take place.

When the transaction is authorized, processor 110 updates the central database to indicate that the desired transaction has taken place. The user is then instructed via video monitor 112 to remove the article from the device 100. Sensors 122a and 122b sense the removal of the article and operate to energize the re/deactivator 120 to change the status of the marker. In other words, the re/deactivator either deactivates the marker (in the case of an authorized check out) or reactivates the marker (in the case of check in). The re/deactivator is turned on at the appropriate time to ensure thorough deactivation of the EAS marker and to ensure that there are no harmful effects to the prerecorded magnetic media within the article. Sensors 122a and 122b also detect when the article has been completely removed from the device. When the article has been completely removed, the re/deactivator 120 is turned off. This ensures that only one article may be processed at a time.

The re/deactivator 120 deactivates EAS markers with a re/deactivating magnetic field that is specifically designed to ensure that any levels of signal degradation on the video cassettes are below perceptible levels.

Figure 2:
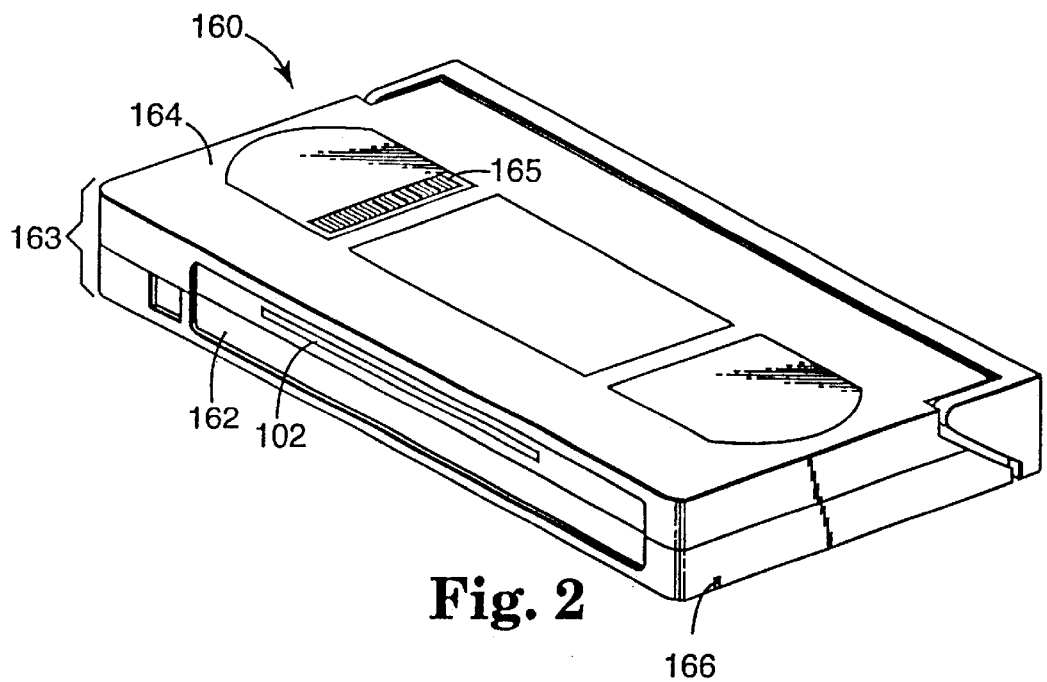
FIG. 2 shows a typical video cassette and preferred placement of an EAS marker and barcode thereon.

FIG. 2 shows a perspective view of a typical video cassette 160. In practice, a marker 102 is preferably placed in recessed portion 162 on side edge 163 of a video cassette 160. In the preferred embodiment, the marker 102 is a dual status marker, such as that described in commonly assigned U.S. Pat. No. 3,765,007. An article identification code 165, such as a barcode, is preferably located on the top side 164 of the video cassette.

Figure 3:
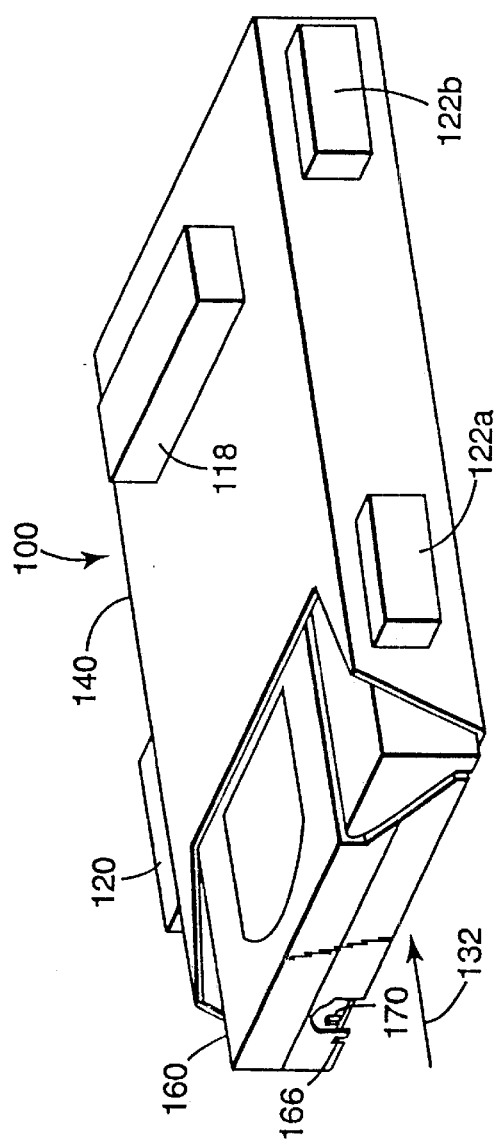
FIG. 3 shows the receiving compartment for a video cassette embodiment of the present device.

The preferred embodiment of the system includes, a receiving compartment 140 that is specifically sized to receive articles having predefined configurations, such as video cassettes, audio cassettes, diskettes, etc. This receiving compartment for use with video cassettes is shown in FIG. 3 and is shown with a video cassette 160 placed therein. Also shown in FIG. 3 are the preferred relative locations of the deactivator 120, sensors 122a and 122b, and article id code scanner 118 with respect to the receiving compartment 140. In use, a video cassette 160 is inserted in the receiving compartment 140 in the direction indicated by arrow 132. The video cassette 160 is oriented such that the side edge 163 having the marker thereon is towards the deactivator 120, and such that the article information code 165 is towards the article id code reader 118. To aid the user in proper insertion of the video cassette, a guide pin 170 could be placed on the floor of the receiving compartment to match up with the groove 166 in the bottom of the video cassette 160. Sensors 122a and 122b operate to determine when the video cassette is properly placed in the receiving compartment 140. Proper placement ensures that the article information code 165 can be read by the article id code reader 118, and that the marker 102 is properly re/deactivated. Similar receiving compartments designed for audio tapes, diskettes, other magnetic media or other articles having known configurations could be substituted for the video cassette receiving compartment shown in FIG. 3 without departing from the scope of the present invention.

Figure 4:
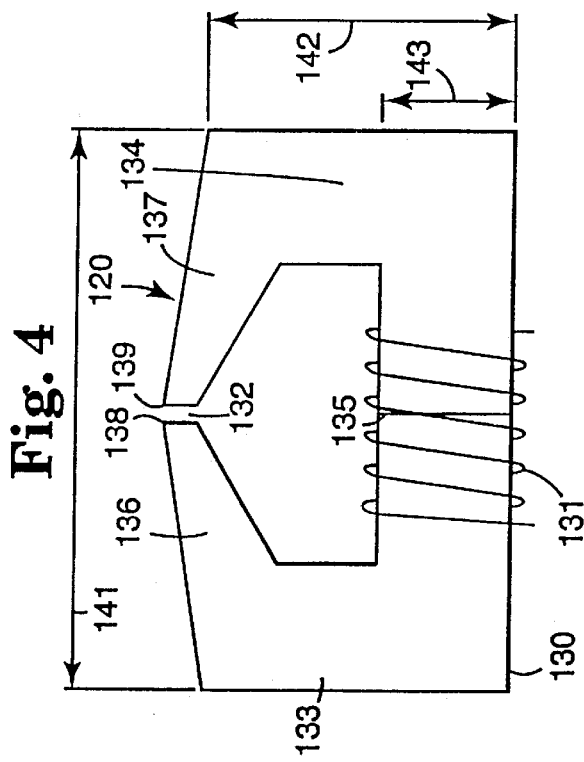
FIG. 4 shows the preferred de/reactivator.

The preferred re/deactivator 120 is shown in FIG. 4. Re/deactivator 120 typically comprises a high permeability magnetic core 130 enclosed by at least one coil 131 such that the magnetic core becomes magnetized by magnetic fields associated with electrical current in coil 131. Magnetic core 130 typically is designed to provide a nearly continuous path through and around coil 131, except for a relatively narrow gap 132. Magnetic core 130 in the example system is formed from two core pieces 133 and 134 which each have one end in contact with the other at surface 135. The core preferably has a rectangular cross-section everywhere except at the tapered polepieces 136 and 137 adjacent gap 132. The tapered polepieces 136 and 137 reduce the rectangular cross-section areas of the poletips 138 and 139, concentrating the magnetic flux across the gap 132, and are configured such that the edges of poletips 138 and 139 protrude to be in closer proximity to the dual status marker on the article. For the deactivation function, current (DC) flows through coil 131 applying a magnetic field to core 130 in a direction approximately perpendicular to surface 135. The induced magnetic flux forms a continuous path around the core, passing through the tapered pole pieces and across gap 132. The resulting magnetic field adjacent gap 132 is at its greatest magnitude within the gap, but fairly large fringe fields extend between pole tip 138 and 139 in close proximity to gap 132. As the dual-status marker 102 attached to the article is removed from the device 100, marker 102 is translated in close proximity to the protruding edges of poletips 138 and 139, subjecting marker 102 to fringe fields of sufficient magnitude to sequentially magnetize each of the remanently magnetized segments which are present on the marker for deactivation purposes. After removal from the device 100, magnetic fields from the remanently magnetized segments will retain the high permeability signal-producing layer of marker 102 in a magnetized state such that the marker will not produce an alarm signal when the article is carried through the interrogation zone of the EAS system. The feature that allows magnetic fields to be used to deactivate a marker on a video cassette without adversely affecting signals recorded on the magnetic tape contained therein is that the fringe magnetic field adjacent gap 132 drops off very rapidly with distance from the protruding edges of poletips 138 and 139, so that the enclosed magnetic tape is not subjected to magnetic fields of sufficient magnitude for erasure or detectable degradation.

In an example system of the invention, magnetic core 130 of re/deactivator 120 is approximately 2.4 cm thick, consisting of three laminated layers of approximately 8 mm thickness of iron formed by a powder metallurgy process. The other dimension of poletips 138 and 139 is about 3 mm and the gap between poletips 138 and 139 is approximately 2 mm. The other dimensions shown in FIG. 4 are 4.7 cm (141), 2.7 (142) and 1.2 (143). The coil 131 preferably consists of about 1130 turns of 29 gauge (approximately 0.3 mm diameter) copper wire, and carries a current of 300–350 mA when driven by a 12 volt DC power supply.

For the reactivation application, the coil 131 is preferably driven by an AC power supply of a frequency high enough to allow the magnetization of each remanently magnetizable segment to reverse repeatedly, more than five cycles, and preferably more than ten cycles, while the segment is still in the magnetic influence of the reactivator device. For reactivation, the alternating current preferably has a peak value approximately in the 300–350 mA range. In alternate preferred embodiments, a higher voltage power supply may be preferred. Also, depending on the frequency selected, the core may consist of electrically isolated metal laminations or of a non-conductive magnetic ferrite material.

FIG. 5 is a simplified flow diagram showing the control steps followed to carry out a transaction in the present device. At block 202 the user id code reader obtains the user number from the user identification code on the user's id card. The system then queries the central database 130 to get the user information and determine whether the user is a valid user. If the user is valid at block 204, the system gets the transaction information at block 206. Various exemplary transactions can include checkout, check in, reserve, etc. At block 208 the system determines whether the transaction is valid, If so, the system checks the status of sensor 122a at block 210 to determine whether an article has been inserted into the receiving compartment. The system waits for a time-out period at block 212 to give the user some time to insert the article. If so, the device looks for the article id code at block 214. If the article id code is present, the article information is obtained from the central database at block 218. If no article id code is found at block 214 and sensor 122b indicates that the article is properly positioned within the receiving compartment at block 215, then an error message is displayed at block 236. In this case, either the article does not have an article id code on it, or the user has inserted the article incorrectly. If at block 215 the sensor 122b is not blocked (e.g., the article not properly positioned in the receiving compartment), the system waits for a time-out period at block 216 to give the user some time to finish inserting the article. The system then verifies that this user can perform the desired transaction on this particular article at block 220. Once the transaction is verified at block 222, the system updates the information in the central database regarding the user corresponding to the user id number and the article corresponding to the article id code in the central database to indicate that the transaction has taken place.

Once the database updates have taken place, the system checks to make sure that the article is properly within the receiving compartment by checking sensor 122b at block 223. If after the timeout period in black 225 the article is not properly positioned, an error message is displayed at block 236. When the article is properly positioned, the system then instructs the user to remove the article from the receiving compartment. At block 224, the system checks the status of sensor 122b to determine whether the user has begun to remove the article. If so, the re/deactivator is turned on at block 228. In this manner, the initial action of removing the article from the receiving compartment operates to turn on the re/deactivator. As the user continues to remove the article from the receiving compartment, the article and the marker thereon are moved passed the re/deactivator, thus reactivating or deactivating the marker, depending upon the transaction being processed. In the case of deactivation, the user is then allowed to remove the article from the facility. In the case of a check-in, the marker would be reactivated so that it can again be protected from unauthorized removal.

At block 230, the system checks the status of sensor 122a to determine whether the article has been completely removed from the receiving compartment. If so, the re/deactivator is turned off at block 234 and the transaction is complete.

If at, any of blocks 204, 208 or 220 the transaction is found to be invalid, an appropriate error message is displayed to the user at block 236. If at any of blocks 212, 216, 226 or 232 a sensor time-out occurs, an appropriate error message, such as a message prompting the user to insert or remove the article, or to change the orientation of the article in the receiving compartment, will be displayed to the user at block 236.

Although specific embodiments have been shown and described herein for purposes of illustration of exemplary embodiments, it will be understood by those of ordinary skill that a wide variety of alternate and/or equivalent implementations designed to achieve the same purposes may be substituted for the specific embodiments shown and described without departing from the scope of the present invention. Those of ordinary skill will readily appreciate that the present invention could be implemented in a wide variety of embodiments. This application is intended to cover any adaptations or variations of the preferred embodiments discussed herein. Therefore, it is intended that this invention be defined by the claims and the equivalents thereof.

We claim:

1. An apparatus for use in tracking and control of articles out of or into a protected area, the apparatus comprising:
    a receiving compartment adapted to receive an article of a plurality of articles, each of the plurality of articles containing prerecorded magnetic data, each article of the plurality of articles having a same predefined configuration with a dual status marker located at a same predetermined position at or near a surface of each article, the receiving compartment sized to accept the article in a predetermined orientation within the receiving compartment; and
    a magnetic field generating device operable to deactivate the marker and to reactivate tee marker by creating a magnetic field proximate the marker, wherein the apparatus further includes at least one sensor for use in determining that the article is in a particular position in the receiving compartment.

2. The apparatus of claim 1, wherein each article of the plurality of articles includes article identification information, and further wherein the apparatus includes an identification reader for use in reading the article identification information when the article is determined to be in the particular position in the receiving compartment.

3. The apparatus of claim 1, wherein the at least one sensor is further for determining when an article in the receiving compartment is being removed from the receiving compartment.

4. A method for use in tracking articles out of or into protected areas, the method comprising:

providing a receiving compartment adapted to receive an article of a plurality of articles, each of the plurality of articles including prerecorded magnetic data, each article of the plurality of articles having a same predefined configuration with a dual status marker located at a same predetermined position at or near a surface of each article, the receiving compartment sized to accept the article in a predetermined orientation within the receiving compartment;

inserting a first article having a dual status marker in an activated state into the receiving compartment;

sensing that the article is properly placed within the receiving compartment; and deactivating the marker of the article in the receiving compartment by creating a magnetic field of sufficient magnitude proximate only the marker, wherein the magnetic field is of a lesser magnitude at a distance from the marker such that the prerecorded magnetic data of the article is not detectably degraded.

5. The method of claim 4, wherein deactivating the marker of the article includes:

removing the article from the receiving compartment;

sensing that the article is being removed;

generating the magnetic field upon sensing that the article is being removed; and deactivating the marker as the article is being removed.

6. The method of claim 4, wherein each article of the plurality of articles includes article identification information, and further wherein the method includes:

providing user information;

reading the article identification information when the article is properly placed in the receiving compartment; and validating a transaction based on the user information and the article information, the marker being deactivated only after the transaction is validated.

7. The method of claim 6, wherein the method further includes updating the user information and the article information with transaction information if the transaction is validated.

8. The method of claim 6, wherein the marker of the article is deactivated during removal of the article from receiving compartment after the transaction is validated.

9. The method of claim 4, wherein the method further includes:

inserting another article having a dual status marker in a deactivated state into the receiving compartment;

sensing that the article is properly placed within the receiving compartment; and reactivating the marker of the article in the receiving compartment by creating a magnetic field of sufficient magnitude proximate only the marker, wherein the magnetic field is of a lesser magnitude at a distance from the marker such that the prerecorded magnetic data of the article is not detectably degraded.

10. The method of claim 9, wherein each article of the plurality of articles includes article identification information, and further wherein the method includes:

providing user information; and reading the article identification information when the article is properly placed in the receiving compartment; and validating a transaction based on the user information and the article information, the marker being reactivated after the transaction is validated.

11. The method of claim 10, wherein the marker of the article is reactivated during removal of the article from receiving compartment after the transaction is validated.

12. A method for use in tracking articles out of or into protected areas, the method comprising:

providing a receiving compartment adapted to receive an article of a plurality of articles, each of the plurality of articles including prerecorded magnetic data, each article of the plurality of articles having a same predefined configuration with a dual status marker located at a same predetermined position at or near a surface of each article, the receiving compartment sized to accept the article in a predetermined orientation within the receiving compartment;

inserting an article having a dual status marker in a deactivated state into the receiving compartment;

sensing that the article is properly placed within the receiving compartment;

reactivating the marker of the article in the receiving compartment by creating a magnetic field of sufficient magnitude proximate only the marker, wherein the magnetic field is of a lesser magnitude at a distance from the marker such that the prerecorded magnetic data of the article is not detectably degraded.

13. The method of claim 12, wherein reactivating the marker of the article includes:

removing the article from the receiving compartment;

sensing that the article is being removed;

generating the magnetic field upon sensing that the article is being removed; and reactivating the marker as the article is being removed.

14. The method of claim 14, wherein each article of the plurality of articles includes article identification information, and further wherein the method includes:

providing user information; and reading the article identification information when the article is properly placed in the receiving compartment; and validating a transaction based on the user information and the article information, the marker being reactivated after the transaction is validated.

15. The method of claim 14, wherein the method further includes updating the user information and the article information with transaction information if the transaction is validated.

16. The method of claim 14, wherein the marker of the article is reactivated during removal of the article from the receiving compartment after the transaction is validated.

* * * * *

UNITED STATES PATENT AND TRADEMARK OFFICE
CERTIFICATE OF CORRECTION

PATENT NO. : 6,438,447 B1
DATED : August 20, 2002
INVENTOR(S) : Belka, Anthony M.

It is certified that error appears in the above-identified patent and that said Letters Patent is hereby corrected as shown below:

Column 6,
Line 67, "and to reactivate tee marker" should be -- and to reactivate the marker --

Column 8,
Line 49, "The method of claim 14, wherein each article" should be -- The method of claim 12, wherein each article --

Signed and Sealed this

Seventeenth Day of December, 2002

JAMES E. ROGAN
*Director of the United States Patent and Trademark Office*